(12) United States Patent
Liao et al.

(10) Patent No.: US 10,687,105 B1
(45) Date of Patent: Jun. 16, 2020

(54) WEIGHTED EXPANSION OF A CUSTOM AUDIENCE BY AN ONLINE SYSTEM

(71) Applicant: Facebook, Inc., Menlo Park, CA (US)

(72) Inventors: Jason Jiawei Liao, Mountain View, CA (US); Divakar D. Balasubramanian, Saratoga, CA (US); Ryan Patrick Batterman, Salinas, CA (US)

(73) Assignee: Facebook, Inc., Menlo Park, CA (US)

( * ) Notice: Subject to any disclaimer, the term of this patent is extended or adjusted under 35 U.S.C. 154(b) by 336 days.

(21) Appl. No.: 15/909,365

(22) Filed: Mar. 1, 2018

(51) Int. Cl.
*H04N 21/2668* (2011.01)
*G06F 16/9535* (2019.01)
*H04L 29/08* (2006.01)
*G06Q 50/00* (2012.01)

(52) U.S. Cl.
CPC ..... *H04N 21/2668* (2013.01); *G06F 16/9535* (2019.01); *G06Q 50/01* (2013.01); *H04L 67/306* (2013.01)

(58) Field of Classification Search
CPC ............ H04N 21/2668; G06F 16/9535; G04L 67/306
USPC .......................................................... 707/738
See application file for complete search history.

(56) References Cited

U.S. PATENT DOCUMENTS

| | | | | |
|---|---|---|---|---|
| 9,729,667 | B2 * | 8/2017 | LeBeau | .................. H04L 67/18 |
| 2016/0164981 | A1 * | 6/2016 | LeBeau | .................. H04L 67/18 709/204 |
| 2016/0232575 | A1 * | 8/2016 | Kirti | .................. G06Q 30/0269 |
| 2017/0041304 | A1 * | 2/2017 | Tal | .................. G06F 1/32 |
| 2017/0262894 | A1 * | 9/2017 | Kirti | .................. G06Q 30/0269 |
| 2018/0189676 | A1 * | 7/2018 | Predovic | ................ G06Q 10/10 |
| 2018/0336598 | A1 * | 11/2018 | Gross-Baser | ...... G06Q 30/0269 |

* cited by examiner

*Primary Examiner* — Dung K Chau
(74) *Attorney, Agent, or Firm* — Fenwick & West LLP

(57) ABSTRACT

An online system defines a new group of users of the online system for a content provider to use as an audience for its content. The online system generates the audience by first allowing the content provider to specify a subset of the users of the online system, along with a weight for each specified user. The online system then performs a lookalike expansion on the specified subset to obtain a larger group of users of the online system who are similar to the specified subset. This lookalike expansion is weighted using the weights provided for each of the members of the specified subset. Once the resulting expanded audience is generated, the online system performs a content selection process for content to present to users of the online system, where membership in the cluster group is used as an eligibility criteria in the content selection process.

20 Claims, 4 Drawing Sheets

WEIGHTED EXPANSION OF A CUSTOM AUDIENCE BY AN ONLINE SYSTEM

BACKGROUND

This disclosure relates generally to online content delivery, in particular, to generating an audience for online content by weighted lookalike expansion of a specified custom-generated audience using weights for members of the custom-generated audience.

Online systems have become increasingly prevalent in digital content distribution and consumption and allow users to more easily communicate with one another. Users of an online system associate with other online system users, forming a web of connections. Additionally, users may share personal information and other stories with other users connected to them via an online system. Examples of information shared by online system users include videos, music, contact information, background information, job information, interests, photos, notes, and/or other member-specific data.

An online system stores videos and other types of media files, such as audio files, pictures, documents, etc., for presenting to users of the online system. These media files can be created by the online system, uploaded by online system users, or received from third parties. Online system users may interact with media files presented to them in various ways. For example, an online system user may play, express preference, comment on, share, hide or leave videos presented to them. An online system user can also decide what media files to share with other users connected to the user at the online system.

In many cases, for both sponsored and non-sponsored (i.e., organic) content, content providers who upload content to the online system for sharing with others may define the audience for that content. The audience definition may be a hard filter that defines which users are eligible to view the content, or it may simply indicate to the online system which users are preferred (e.g., so that the online system may target those users with suggestions to view the content). For example, an owner of a brand that has a presence on the online system may upload a video about the brand and further define as an audience for that video any users who have interacted with the brand in the online system. Then, the online system selects users to whom to deliver that video using, at least in part, that audience definition to determine which users are eligible to be presented with the video. Other common ways to define a target audience include demographic information about users, location or other contextual information about users, and information about users' social connections.

Precise targeting of a well-defined audience is increasingly important as the competition for users' attention online increases. Each day the amount of online content grows, which makes delivering content to users for whom the content was not intended even more wasteful of users' time, limited screen space, and computing resources. But despite the many existing ways to define an audience for content, there is a need for improved methods to enable content providers to deliver content to their desired users more precisely while avoiding including users in the audience who are less valuable to the content providers.

SUMMARY

In various embodiments of the invention, an online system defines a new group of users of the online system for a content provider to use as an audience for its content. The online system generates the audience by first allowing the content provider to specify a subset of the users of the online system, along with a weight for each specified user. The weight for each user indicates how well it matches the ideal profile of the content provider's intended audience, and it may be specified by the content provider according to any mechanism it uses to value an audience member. In many cases the specified subset of users may be small in relation to the overall number of users of the online system. Since the content provider may wish to reach as many relevant users as possible, the online system performs a lookalike expansion on the specified subset to obtain a larger group of users of the online system who are similar to the specified subset. This lookalike expansion is weighted using the weights provided for each of the members of the specified subset, which allows the content provider greater control in generating a relevant audience for its content.

In one example, the online system receives messages from client devices of a plurality of users who have visited one or more webpages of the third party system, where each message includes a weight associated with the user. These messages may be, for example, a redirect request caused by the user's rendering of a web page of content on a third party website. The online system identifies the users at the online system for at least a plurality of the received messages, for example, by accessing a cookie in the domain of the online system stored on each user's client device. The online system logs the received weights for each identified user and includes at least some of the identified users in a custom audience group for the content item.

The online system then expands this custom audience using the weights to add additional users of the online system to the audience. For each candidate user of a plurality of users of the online system who are not already included in the custom audience group, the online system performs a cluster expansion process. This process uses a cluster model that outputs a cluster score for the candidate user indicating a similarity of the candidate user to the users of the custom audience group, weighted by the weights for each user of the custom audience group. The online system applies the cluster model to one or more characteristics of the candidate user, determines whether to include the candidate user in a cluster group for the content item based on the candidate user's cluster score, and then includes the candidate user in the cluster group based on the determination. Once the resulting expanded audience is generated, the online system can perform a content selection process for the content item for presentation to one or more of the users of the online system, using membership in the cluster group as an eligibility criteria in the content selection process.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
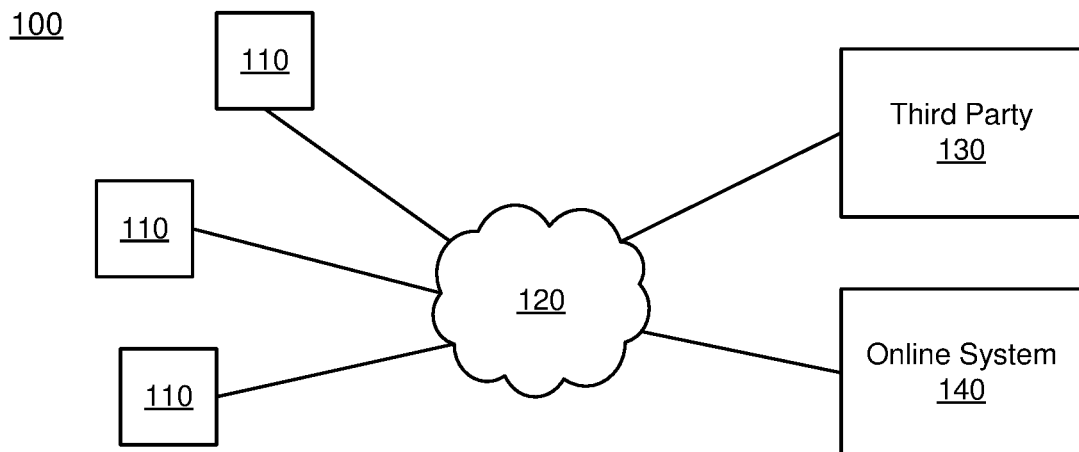
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In some embodiments, a client device 110 executes a software module that plays videos. The software module allows the user to play, pause, or leave a video.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130. The third party system 130 may compensate the online system 140 in exchange for providing content to the users of the online system.

Figure 2:
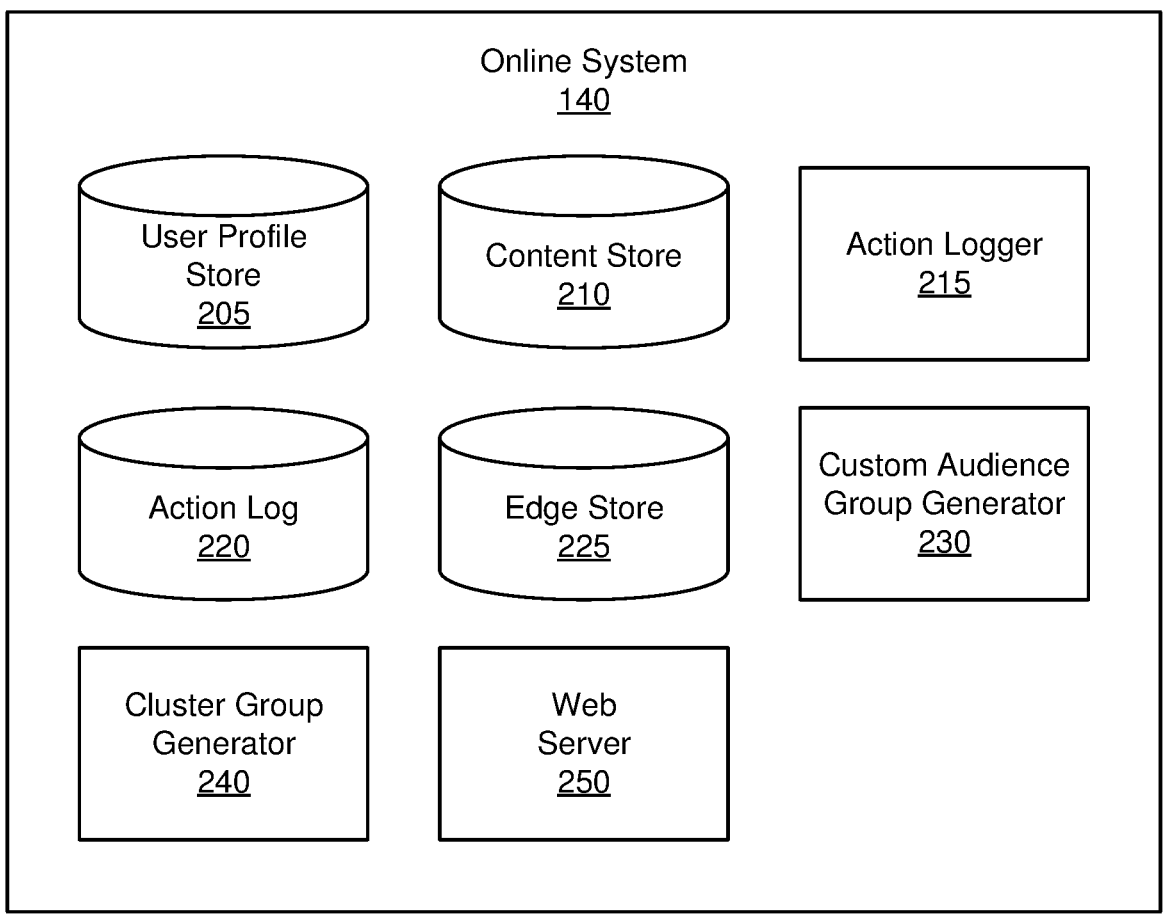
FIG. 2 is a block diagram of an online system in which a custom audience group generator and a cluster group generator operates, in accordance with an embodiment.

FIG. 2 is a block diagram of the online system 140 in which a secondary content module 230 operates. The online system 140 shown in FIG. 2 includes a user profile store 205, a content store 210, an action logger 215, an action log 220, an edge store 225, a secondary content module 230, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store

210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The content store 210 stores primary content items for presentation to a user. Also, the content store 210 stores secondary content items for inserting into primary content items and for presentation to a user along with the primary content items. Content of a secondary content item can be text, image, audio, video, or any other suitable data presented to a user. In various embodiments, the content of a secondary content item also specifies a page of content. For example, a secondary content item includes a landing page specifying a network address of a page of content to which a user is directed when the secondary content item is accessed.

In some embodiments, a secondary content item is associated with a bid amount. The bid amount is included in the secondary content item by a user and is used to determine an expected value, such as monetary compensation, provided by an advertiser to the online system 140 if content in the secondary content item is presented to a user, if the content in the secondary content item receives a user interaction when presented, or if any suitable condition is satisfied when content in the secondary content item is presented to a user. For example, the bid amount included in a secondary content item specifies a monetary amount that the online system 140 receives from a user who provided the secondary content item to the online system 140 if content in the secondary content item is displayed. In some embodiments, the expected value to the online system 140 of presenting the content from the secondary content item may be determined by multiplying the bid amount by a probability of the content of the secondary content item being accessed by a user.

In various embodiments, a secondary content item includes various components capable of being identified and retrieved by the online system 140. Example components of a secondary content item include: a title, text data, image data, audio data, video data, a landing page, a user associated with the content item, or any other suitable information. The online system 140 may retrieve one or more specific components of a secondary content item for inserting to a primary content item in some embodiments. For example, the online system 140 may identify a title and an image from a secondary content item and insert the title and the image to the primary content item rather than the secondary content item in its entirety.

Various secondary content items may include an objective identifying an interaction that a user associated with a secondary content item desires other users to perform when presented with content included in the secondary content item. Example objectives include: installing an application associated with a secondary content item, indicating a preference for a secondary content item, sharing a secondary content item with other users, interacting with an object associated with a secondary content item, or performing any other suitable interaction. As content from a secondary content item is presented to online system users along with a primary content item, the online system 140 logs interactions between users presented with the secondary content item or with objects associated with the secondary content item. Additionally, the online system 140 receives compensation from a user associated with a secondary content item as online system users perform interactions with a secondary content item that satisfy the objective included in the secondary content item.

Additionally, a secondary content item may include one or more targeting criteria specified by the user who provided the secondary content item to the online system 140. Targeting criteria included in a secondary content item request specify a target audience for the content, which may comprise one or more characteristics of users eligible to be presented with the secondary content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were interacted, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The custom audience group generator 230 communicates with one or more client devices 110 and/or third party systems 130 to receive a specified list of users of the online system. This list of users defines a particular custom audience. Once defined, a custom audience can be used to deliver content from a content provider, which may be associated with the third party system 130 that helped to define it. In one embodiment, the third party system 130 provides a list of users that it would like to include in a custom audience to the online system 140, which list may be obfuscated by a one-way hash to protect users' personal information. This embodiment is described in U.S. application Ser. No. 13/306,901, filed Nov. 29, 2011, which is incorporated by reference in its entirety. In another embodiment, the custom audience is populated by users who perform actions online, and those actions cause the users' devices 110 to redirect to the online system 140. The online system then obtains these users' identities and adds them to a custom audience. This embodiment is described in U.S. application Ser. No. 14/177,300, filed Feb. 11, 2014, which is incorporated by reference in its entirety. More details about the custom audience group generator 230 are described in conjunction with FIG. 3.

The cluster group module 240 performs a lookalike expansion algorithm on a seed group of users to obtain a larger group of users who share characteristics with the seed group. In embodiments of the invention, the specified custom audience is used as the seed group for the lookalike expansion, thereby generating a larger group of users of the online system 140 who are similar to the custom audience specified by the third party system 130. Embodiments of lookalike expansion algorithms in batch processes and in real-time are described in U.S. application Ser. No. 13/297,117, filed Nov. 15, 2011, and U.S. application Ser. No. 14/290,355, filed May 29, 2014, each of which is incorporated by reference in its entirety. Further, the lookalike expansion is weighted according to the weights specified by the third party system 130 for each user in the custom audience group. This gives the third party system 130 greater ability to shape the resulting expanded audience by specifying which users are more representative of the desired audience. Embodiments of lookalike expansion algorithms using weights are described in U.S. application Ser. No. 15/068,526, filed Mar. 11, 2016, which is incorporated by reference in its entirety. More details about the cluster group module 240 are described in conjunction with FIG. 4.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Generation of Weighted Expansion of Custom Audience

Figure 3:
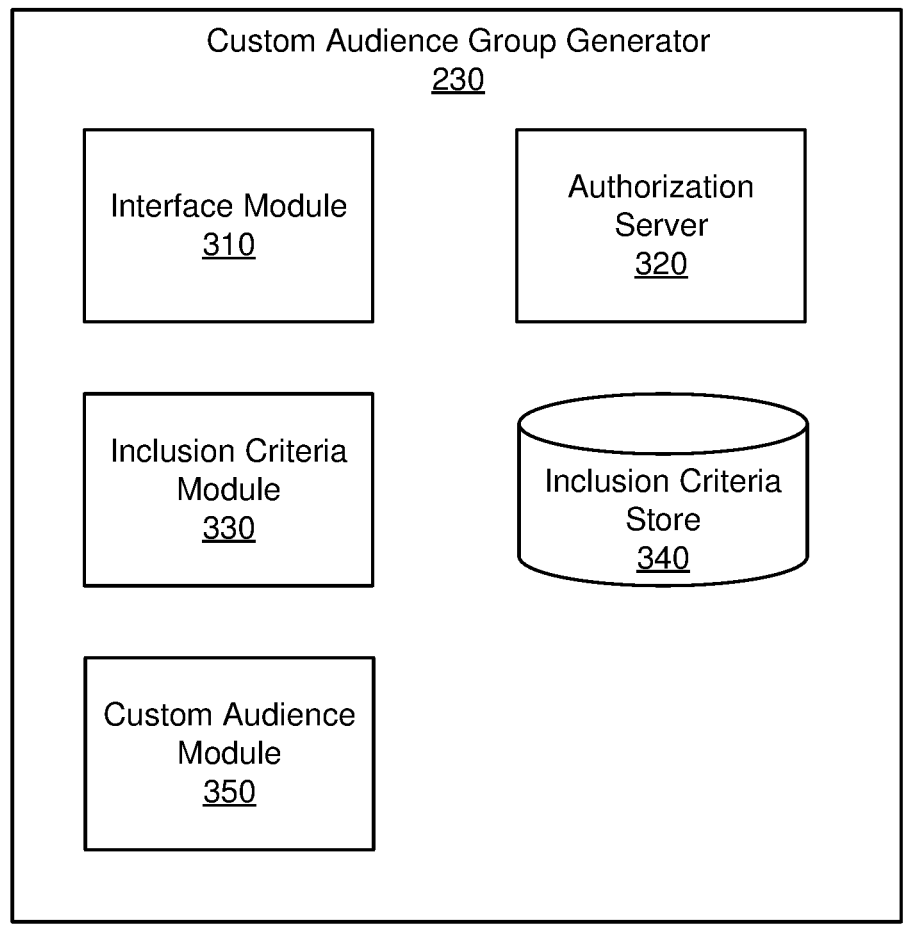
FIG. 3 is a block diagram of the custom audience group generator, in accordance with an embodiment.

FIG. 3 is a block diagram of the custom audience group generator 230, in accordance with an embodiment. As described above, the custom audience generator 230 obtains a list of users of the online system 140 and associated weights, which indicate users' relevance to a desired audience of a content provider. The custom audience group generator 230 in the embodiment of FIG. 3 includes an interface module 310, an authorization server 320, an inclusion criteria module 330, an inclusion criteria store 340, and a custom audience module 350. In other embodiments, the custom audience group generator 230 may include additional, fewer, or different components for various applications.

The interface module 310 facilitates communication of the secondary content module 230 with other entities. For example, the interface module 310 receives a video to be presented by the online system 140 to a target user. Also, the interface module 310 receives secondary content for inserting into the video. In some embodiments, the interface module 310 receives the video and secondary content from the web server 250. The interface module 310 can further sends the video and secondary content to the other components of the secondary content module 230 for identifying a position where the secondary content is added to the video and determining whether to modify the video by adding the secondary content at the identified position.

The authorization server 320 enforces one or more privacy settings of the users of the online system 140. A privacy setting of a user determines how particular information associated with a user may be shared. In some embodiments, one or more privacy settings are stored in the user profile of a user in the user profile store 205 or are stored in the authorization server 320 and associated with a user profile. A privacy setting may specify whether the online system 140 maintains an association of the user with a one or more audience groups, allowing the user to opt out of advertisement targeting based on audience group membership; for example, the privacy setting allows a user to remove the user's identification information from the audience group and/or prevent the user's user identification information from being included in the audience group. In one embodiment, a privacy setting specifies particular information associated with a user and identifies the entity or entities with whom the specified information may be shared. Examples of entities with which information can be shared include other users, applications, third party systems 130 or any entity that can potentially access the information. Examples of information that may be shared by a user include user profile information (e.g., profile photo, phone numbers associated with the user, location, etc.), connections between the user and additional users, and actions taken by the user (e.g., adding a connection, changing user profile information).

The authorization server 320 includes logic to determine if certain information associated with a user may be accessed by users connected to the user, a third-party system 130 and/or other applications and entities. For example, a third-party system 130 that attempts to access a user's comment about a uniform resource locator (URL) associated with the third-party system 130 must get authorization from the authorization server 320 to access information associated with the user. Based on the user's privacy settings, the authorization server 320 determines if another user, a third-party system 130, an application, or another entity is allowed to access information associated with the user, including information about actions taken by the user. For example, the authorization server 320 uses a user's privacy setting to determine if the user's comment about a URL associated with the third-party system 130 may be presented to the third-party system 130 or may be presented to another user. This enables a user's privacy setting to specify which other entities or users are allowed to receive data about the user's actions or other data associated with the user.

One or more inclusion criteria are used by the online system 140 to associate a user with one or more audience groups. An inclusion criteria specifies criteria for generating one or more audience groups including one or more users of an online system. In one embodiment, one or more inclusion criteria identify characteristics of users included in an audience group. For example, inclusion criteria associate one or more locations with an audience group, where users are included in an audience group based on a location of the user or based on a location associated with content with which the user interacts (e.g., a website for a hotel in Paris vs. a website for a hotel in London). Other examples of inclusion criteria include a user in an audience group based on a time elapsed between a current time and a time when a user performed a specific type of interaction, based on types of actions performed by the user with content provided by a third party system 130 (e.g., viewing a page from a website, clicking, interactions with an application, etc.), based on language of content presented to the user (e.g., a French version of website versus an English version of the website), or any other suitable criteria.

The inclusion criteria module 330 simplifies generation of one or more inclusion criteria. In one embodiment, the inclusion criteria module 235 provides an audience widget to one or more third party systems 130. For example, the audience widget is code or instructions for inclusion in content provided by the third party system 130 for execution by a client device 110 when received along with the content (e.g., a tracking pixel, JAVASCRIPT®, etc.). When the client device 110 executes the code or instructions comprising the audience widget, the client device 110 communicates contextual information describing interaction with content via the client device 110 to the online system 140 or to a third party system 130. In some embodiments, the audience widget may be created using a software development kit (SDK) provided to third party systems 130 by the online system 140. And in some instances, the online system 140 charges a third party system 130 a fee for using the SDK, allowing the online system 140 to receive additional compensation from the third party system 130.

For example, a third party system 130 includes the audience widget in one or more web pages provided by the third party system 130. When a client device 110 requests a web page including the audience widget from the third party system, the audience widget communicates with the third party system 130, which sends a redirect request 110 to the client device 110. When the client device 110 receives the redirect request from the third party system 130, the client device 110 communicates the contextual information to the online system 140. In alternate embodiments, the logic of which interaction to capture and when to provide the contextual information to the online system 140 is executed by the audience widget on the client device 110. For example, due to one or more interactions between the user device 110 and the third party system 130, the audience widget collects contextual information and causes the user device 110 to provide the collected contextual information to the online system 140. In some embodiments the audience widget may cause the third party system 130 to communicate one or more inclusion criteria along with the redirect request to the client device 110, which communicates the one or more inclusion criteria to the online system 140 along with the contextual information.

The contextual information provided to the online system 140 includes user identification information associated with the user of the client device 110 and information describing interaction between the user and the content provided via the client device 110. The user identification information corresponds to a user profile associated with the user by the online system 140. In some embodiments, the user identification information is used by an application associated with the online system 140 and executing on the client device 110. Additionally, in some embodiments, the user identification information may include a cookie that identifies the client device 110, or an application executing on the client device 110 used to access content, to the online system 140. The information describing interaction between the user and the provided content includes information identifying the content presented via a client device 110 (e.g., an identifier of a web page presented by the client device 110, such as a URL, an identifier associated with the third party system 130 providing the content, information describing the content, etc.). Additionally, the information describing interaction between the user and the provided content describes interactions between the user and the presented content (e.g., web page or application). For example, the information describes a type of action performed by the user, content with which the user interacted (e.g., describing whether a user looked at and/or bought an item from a website, looked at and/or booked a room via a website, etc.), or other suitable information describing interaction with the content. In some embodiments, the information describing interaction between the user and the provided content may be based on one or more custom parameters that control types of information collected by the user device 110 and provided to the online system 140. For example, a custom parameter may track if a certain event occurs in a certain location.

In some embodiments, the inclusion criteria module 330 provides a user interface to the third party system 130 to specify one or more inclusion criteria and communicate the one or more inclusion criteria to the online system 140. In some embodiments, a third party system 130 administrator may login to the online system 140 and create, edit, delete, or otherwise modify one or more inclusion criteria via the user interface. In other embodiments, the third party system 130 generates the one or more inclusion criteria and provides at least one of the generated inclusion criteria to the online system 140 using any suitable method.

The inclusion criteria store 340 maintains one or more inclusion criteria associated with one or more third party systems 130. As described above, an inclusion criteria identifies one or more types of interactions associated with users or another suitable characteristic associated with users included in an audience group associated with the inclusion criteria. For example, the inclusion criteria store 240 includes an identifier associated with a third party system 130 and one or more inclusion criteria associated with the identifier, simplifying retrieval of inclusion criteria associated with a third party system 130. In some embodiments, an inclusion criteria may be triggered by information received based on one or more custom parameters. For example, an inclusion criteria causes the online system 140 to place a user in custom audience A if the user is associated with a particular city and check in date. In some embodiments, information identifying content (e.g., uniform resource locators) associated with inclusion criteria, such as content provided by a third party system 130 and associated with the inclusion criteria, is also included in the inclusion criteria store 340.

The custom audience module 350 determines audience groups to associate with a user based on a portion of the contextual information received from the client device 110 and one or more inclusion criteria. As further described below in conjunction with FIG. 3, the custom audience module 350 extracts user identification information and information describing user interaction from the contextual information. For example, the custom audience module 350 extracts user identifying information associated with a user of the online system 140, an identifier associated with a third party system 130 providing content, an identifier of the content, and information describing interaction between the user and the content. The custom audience module 350 retrieves one or more inclusion criteria from the inclusion criteria store 340 based on the contextual information and applies the retrieved inclusion criteria to the information describing user interaction. For example, inclusion criteria associated with a third party system 130 identified by the contextual information are retrieved from the inclusion criteria store 240. Additionally, one or more privacy settings associated with the user corresponding to the extracted user identifying information are retrieved from the authorization server 320, and the custom audience module 350 associates the user with one or more audience groups based on the privacy settings, the information describing the user's interaction with content, and the inclusion criteria.

Figure 4:
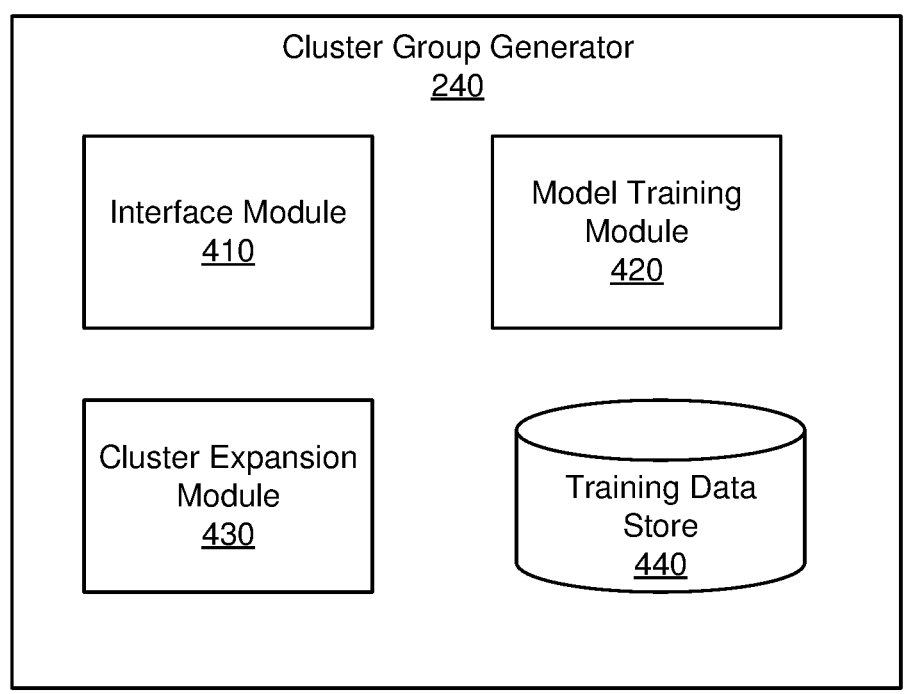
FIG. 4 is a block diagram of the cluster group generator, in accordance with an embodiment.

FIG. 4 is a block diagram of the cluster group generator 240, in accordance with an embodiment. As discussed above, the cluster group generator performs a weighted lookalike expansion on the custom audience, which is used as the seed group for the lookalike expansion algorithm. The cluster group generator 240 in the embodiment of FIG. 4 includes an interface module 410, a model training module 420, a cluster expansion module 430, and a training data store 440. In other embodiments, the cluster group generator 240 may include additional, fewer, or different components for various applications.

The interface module 410 communicates with the custom audience group generator 230 to obtain the custom audience, which comprises a list of users of the online system 140. The interface module 410 also obtains the weights for each of the users in the custom audience. The custom audience is then used as the seed group in a lookalike expansion algorithm, which uses the users' weights to tune the resulting expanded group.

The model training module 420 trains a prediction model that outputs a score for a given candidate user, where the score indicates how well the candidate user fits the seed group. Methods of training prediction models used in lookalike expansion algorithms, both in batch processes and in real time, and using weights, are described above and in the patent applications incorporated by reference. In general, the model training module 420 extracts features that are relevant to the prediction model, which include features associated with a candidate user that describe characteristics of the user that are relevant to the determination for whether to include the candidate user in the expanded audience. The model training module 420 accesses training data from the training data store 440, which may include positive and negative examples for training the prediction model. The positive examples includes features of candidate users that should be included in the expanded group, and the negative examples includes features of candidate users that should not be included. The model training module 420 then trains the prediction model using the examples from the training data store 440. The trained prediction model outputs, for a given candidate user, how close the candidate user is to a weighted seed group of users, where the custom audience is used as the seed group. Various types of machine learning models may be used. Examples of training algorithms may include mini-batch-based stochastic gradient descent (SGD), gradient boosted decision trees (GBDT), SVM (support vector machine), neural networks, logistic regression, naïve Bayes, memory-based learning, random forests, decision trees, bagged trees, boosted trees, or boosted stumps The cluster expansion module 430 uses the trained prediction model to determine, for any given candidate user, whether to include the user in the expanded audience. For example, the cluster expansion module 430 evaluates a plurality of candidate users of the online system 130 that are not already in the customer audience group. For each candidate user, the cluster expansion module 430 applies the prediction module to obtain a score for the candidate user. The cluster expansion module 430 then determines whether the candidate user should be added to the expanded audience, such as by comparing the score to a fixed threshold or selecting a top percentile of candidate users' scores.

Figure 5:
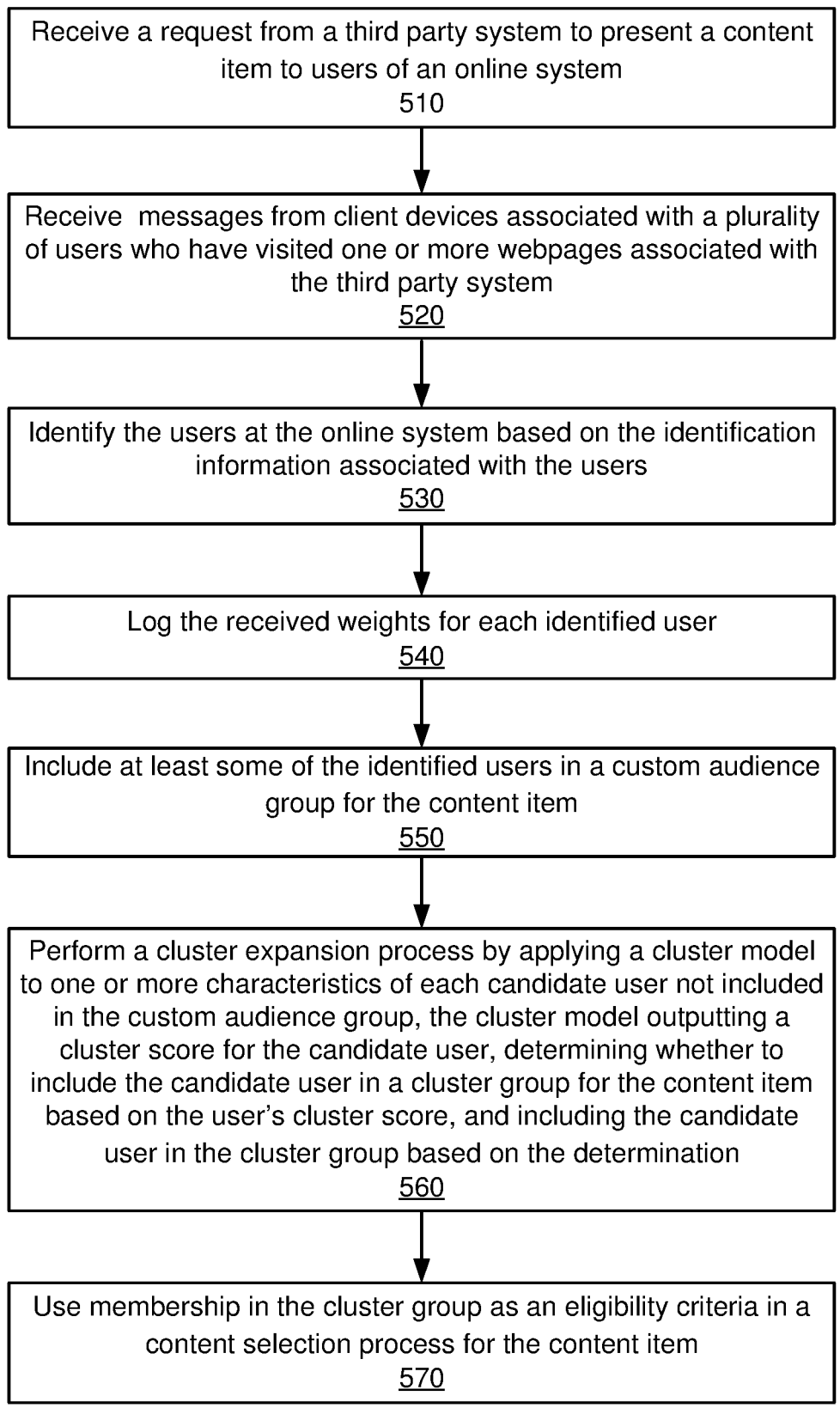
FIG. 5 is a flowchart illustrating a process of generating a cluster group based on a custom audience group, in accordance with an embodiment.

FIG. 5 is a flowchart illustrating a process of inserting secondary content to a video, in accordance with an embodiment. In some embodiments, the process is performed by the online system 140, although some or all of the operations in the method may be performed by other entities in other embodiments. In some embodiments, the operations in the flow chart are performed in a different order and can include different and/or additional steps.

The online system 140 receives 510 a request from a third party system to present a content item to users of an online system in connection with an expanded target audience associated with the content item.

The online system 140 receives 520 messages from client devices 110 associated with a plurality of users who have visited one or more webpages associated with the third party system. The messages includes identification information associated with the users and a weight or information allowing the online system 140 to compute a weight for the user. The online system 140 also identifies 530 the users associated with each of the messages using, for example, cookies or other information stored on the users' client devices 110. For each of the identified users, the online system 140 then logs 540 the user's identity and specified weight.

Based on this logged data, the online system 140 includes 550 the identified users in a custom audience group for the content item. The online system 140 then performs 560 a weighted expansion algorithm using the custom audience group as the seed group. Specifically, for each candidate user of a plurality of users of the online system 140 who are not already included in the custom audience group, the online system 140 applies the trained prediction model to compute a score for the candidate user and uses that score to determine whether to include the candidate user in the expanded audience.

Once the custom audience has been expanded to include additional users, the online system 140 uses 570 membership in the expanded cluster group as an eligibility criteria in a content selection process for the content item for presentation to one or more of the users of the online system. In some embodiments, the online system 140 provide the content item for presentation to users in the custom audience group and the cluster group.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   receiving a request from a third party system to present a content item to users of an online system;
   receiving messages from client devices of a plurality of users who have visited one or more webpages of the third party system, each message including a weight associated with the user;
   identifying the users at the online system for at least a plurality of the received messages;
   logging the received weights for each identified user;
   including at least some of the identified users in a custom audience group for the content item;
   for each candidate user of a plurality of users of the online system who are not included in the custom audience group, performing a cluster expansion process by:
      applying a cluster model to one or more characteristics of the candidate user maintained by the online system, the cluster model outputting a cluster score for the candidate user indicating a similarity of the candidate user to the users of the custom audience group, weighted by the weights for each user of the custom audience group,
      determining whether to include the candidate user in a cluster group for the content item based on the candidate user's cluster score, and
      including the candidate user in the cluster group based on the determination; and
   performing a content selection process for the content item for presentation to one or more of the users of the online system, using membership in the cluster group as an eligibility criteria in the content selection process.

2. The method of claim 1, wherein generating a cluster model based on the values associated with the users and one or more characteristics of the users maintained by the online system comprises:
   retrieving the one or more characteristics of each of the users;
   assigning a weight to each of the users in the custom audience group based on the value associated with the user; and
   determining one or more parameters for the cluster model based on the weights of the users and the one or more characteristics of users.

3. The method of claim 2, wherein determining one or more parameters for the cluster model based on the weights of the users and the one or more characteristics of users comprises:
   associating a weight of each user with the one or more characteristic of the user.

4. The method of claim 1, wherein generating a cluster model based on the values associated with the users and one or more characteristics of the users maintained by the online system comprises:
   applying a machine learning technique to train the cluster model by using the values and one or more characteristics of the users as training data.

5. The method of claim 1, wherein including at least some of the users in a custom audience group for the content item comprises:
   comparing the value associated with a user with a threshold value; and
   determining to include the user in the custom audience group based on the value associated with the user at least equal to the threshold value.

6. The method of claim 1, wherein identifying the users at the online system for at least a plurality of the received messages comprises, for each identified user, accessing stored information on the user's client device that contains an identifier for the user at the online system, and using the identifier to retrieve the user's identity from a user profile database maintained by the online system.

7. The method of claim 1, wherein the one or more characteristics of a user include at least one of the following: hobbies or preferences, location, age, gender, educational background, work experience, historical actions of the user, connections associated with the user on the online system, or any combination thereof.

8. The method of claim 1, wherein the weight for a user is determined based on a rule specified by the third party system.

9. The method of claim 1, wherein the weight for a user is determined based on an action performed by the user during the user's visit of the webpage of the third party system.

10. The method of claim 1, wherein each of the messages received from client devices associated with a plurality of users who have visited one or more webpages associated with the third party system are responsive to a redirect link on the one or more web pages, and where the weight is embedded in the redirect link.

11. A computer program product comprising a nontransitory computer-readable storage medium containing computer program code for:
   receiving a request from a third party system to present a content item to users of an online system;
   receiving messages from client devices of a plurality of users who have visited one or more webpages of the third party system, each message including a weight associated with the user;
   identifying the users at the online system for at least a plurality of the received messages;
   logging the received weights for each identified user;
   including at least some of the identified users in a custom audience group for the content item;
   for each candidate user of a plurality of users of the online system who are not included in the custom audience group, performing a cluster expansion process by:
      applying a cluster model to one or more characteristics of the candidate user maintained by the online system, the cluster model outputting a cluster score for the candidate user indicating a similarity of the candidate user to the users of the custom audience group, weighted by the weights for each user of the custom audience group, determining whether to include the candidate user in a cluster group for the content item based on the candidate user's cluster score, and including the candidate user in the cluster group based on the determination; and performing a content selection process for the content item for presentation to one or more of the users of the online system, using membership in the cluster group as an eligibility criteria in the content selection process.

12. The computer program product of claim 11, wherein generating a cluster model based on the values associated with the users and one or more characteristics of the users maintained by the online system comprises:

retrieving the one or more characteristics of each of the users;

assigning a weight to each of the users in the custom audience group based on the value associated with the user; and determining one or more parameters for the cluster model based on the weights of the users and the one or more characteristics of users.

13. The computer program product of claim 12, wherein determining one or more parameters for the cluster model based on the weights of the users and the one or more characteristics of users comprises:

associating a weight of each user with the one or more characteristic of the user.

14. The computer program product of claim 11, wherein generating a cluster model based on the values associated with the users and one or more characteristics of the users maintained by the online system comprises:

applying a machine learning technique to train the cluster model by using the values and one or more characteristics of the users as training data.

15. The computer program product of claim 11, wherein including at least some of the users in a custom audience group for the content item comprises:

comparing the value associated with a user with a threshold value; and determining to include the user in the custom audience group based on the value associated with the user at least equal to the threshold value.

16. The computer program product of claim 11, wherein identifying the users at the online system for at least a plurality of the received messages comprises, for each identified user, accessing stored information on the user's client device that contains an identifier for the user at the online system, and using the identifier to retrieve the user's identity from a user profile database maintained by the online system.

17. The computer program product of claim 11, wherein the one or more characteristics of a user include at least one of the following: hobbies or preferences, location, age, gender, educational background, work experience, historical actions of the user, connections associated with the user on the online system, or any combination thereof.

18. The computer program product of claim 11, wherein the weight for a user is determined based on a rule specified by the third party system.

19. The computer program product of claim 11, wherein the weight for a user is determined based on an action performed by the user during the user's visit of the webpage of the third party system.

20. The computer program product of claim 11, wherein each of the messages received from client devices associated with a plurality of users who have visited one or more webpages associated with the third party system are responsive to a redirect link on the one or more web pages, and where the weight is embedded in the redirect link.

* * * * *